(12) United States Patent
Cheng et al.

(10) Patent No.: US 12,328,393 B2
(45) Date of Patent: Jun. 10, 2025

(54) COMPUTER-BASED SYSTEMS CONFIGURED FOR AUTHENTICATING BASED ON GENERATED VIRTUAL TOKENS AND METHODS OF USE THEREOF

(71) Applicant: Capital One Services, LLC, McLean, VA (US)

(72) Inventors: Lin Ni Lisa Cheng, New York, NY (US); Elisa-Michelle Rodriguez, Fairfax, VA (US); Leeyat Bracha Tessler, Arlington, VA (US); Kyle Johnson, Seattle, WA (US); Angelina Wu, Vienna, VA (US); Rocky Guo, Vienna, VA (US); Michael Saia, Walpole, MA (US)

(73) Assignee: Capital One Services, LLC, McLean, VA (US)

( * ) Notice: Subject to any disclaimer, the term of this patent is extended or adjusted under 35 U.S.C. 154(b) by 520 days.

(21) Appl. No.: 17/581,683

(22) Filed: Jan. 21, 2022

(65) Prior Publication Data

US 2023/0239150 A1 Jul. 27, 2023

(51) Int. Cl.
*H04L 9/32* (2006.01)
*G06Q 20/34* (2012.01)
*H04L 9/08* (2006.01)

(52) U.S. Cl.
CPC ......... *H04L 9/3213* (2013.01); *G06Q 20/351* (2013.01); *H04L 9/0869* (2013.01); *H04L 9/3236* (2013.01); *H04L 2209/56* (2013.01)

(58) Field of Classification Search
None
See application file for complete search history.

(56) References Cited

U.S. PATENT DOCUMENTS

| | | | |
|---|---|---|---|
| 8,751,793 B2 * | 6/2014 | Ginter | H04N 21/6581 |
| | | | 726/28 |
| 9,105,021 B2 | 8/2015 | Tobin | |
| 10,943,220 B1 | 3/2021 | Maeng | |
| 2012/0191615 A1 * | 7/2012 | Schibuk | G06Q 20/401 |
| | | | 705/76 |
| 2012/0209749 A1 * | 8/2012 | Hammad | G06Q 20/20 |
| | | | 705/27.1 |
| 2013/0036048 A1 * | 2/2013 | Campos | G06Q 20/40 |
| | | | 705/41 |
| 2013/0304642 A1 * | 11/2013 | Campos | G06Q 20/3572 |
| | | | 705/41 |

(Continued)

*Primary Examiner* — William J Jacob
(74) *Attorney, Agent, or Firm* — Greenberg Traurig, LLP

(57) ABSTRACT

Systems and methods of the present disclosure enable virtual tokens for dynamically mapping virtual account numbers to actual accounts. The systems and methods include receiving an electronic data modification instruction of a virtual record modification to cause at least one data modification to at least one attribute of a virtual record data structure associated with the actual account. A user record associated with the virtual record is determined, and a record modification preference associated with the user record is determined based on the modification condition. An authorization instruction is generated to authorize the electronic data modification instruction to cause the modification by instructing at least one database management system to modify the user record according to the record-specific modification.

20 Claims, 7 Drawing Sheets

(56) References Cited

U.S. PATENT DOCUMENTS

| | | | |
|---|---|---|---|
| 2014/0040145 A1* | 2/2014 | Ozvat | G06Q 20/401 |
| | | | 705/64 |
| 2014/0067677 A1* | 3/2014 | Ali | G06Q 20/40 |
| | | | 705/44 |
| 2015/0356551 A1 | 12/2015 | Dogin et al. | |
| 2020/0320526 A1* | 10/2020 | Yoo | G06Q 20/38 |

\* cited by examiner

COMPUTER-BASED SYSTEMS CONFIGURED FOR AUTHENTICATING BASED ON GENERATED VIRTUAL TOKENS AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to computer-based platforms and systems configured to authenticate based on generated virtual tokens and methods of use thereof and dynamically map a virtual account number to an actual financial account for a user and methods of use thereof.

BACKGROUND OF TECHNOLOGY

Typically, online activities may be more exposed to bad actors due to anonymity and lack of physical presence component which may result in frequent fraudulent access and access attempts.

SUMMARY OF DESCRIBED SUBJECT MATTER

In some embodiments, the present disclosure provides an exemplary technically improved computer-based method that includes at least the following steps of receiving, by at least one processor, an electronic data modification instruction of a virtual record modification to cause at least one data modification to at least one attribute of a virtual record data structure; where the electronic data modification instruction of the virtual account modification includes a virtual identifier associated with the virtual record, and at least one modification condition; determining, by the at least one processor, at least one user record associated with the virtual record based at least in part on the virtual identifier; determining, by the at least one processor, at least one record modification preference associated with the at least one user record based at least in part on the at least one modification condition; utilizing, by the at least one processor, a record-specific modification machine learning model to predict at least one record-specific modification in response to the virtual record modification based at least in part on the at least one modification condition and the at least one record modification preference; generating, by the at least one processor, an authorization instruction to authorize the electronic data modification instruction to cause the at least one modification by instructing at least one database management system to modify the at least one user record according to the at least one record-specific modification; and instructing, by the at least one processor, a computing device to display the at least one record-specific modification to the at least one user record.

In some embodiments, the present disclosure provides an exemplary technically improved computer-based system that includes at least the following components of: at least one processor configured to execute software instructions that cause the at least one processor to perform steps to: receive an electronic data modification instruction of a virtual record modification to cause at least one data modification to at least one attribute of a virtual record data structure; where the electronic data modification instruction of the virtual account modification includes a virtual identifier associated with the virtual record, and at least one modification condition; determine at least one user record associated with the virtual record based at least in part on the virtual identifier; determine at least one record modification preference associated with the at least one user record based at least in part on the at least one modification condition; utilize a record-specific modification machine learning model to predict at least one record-specific modification in response to the virtual record modification based at least in part on the at least one modification condition and the at least one record modification preference; generate an authorization instruction to authorize the electronic data modification instruction to cause the at least one modification by instructing at least one database management system to modify the at least one user record according to the at least one record-specific modification; and instruct a computing device to display the at least one record-specific modification to the at least one user record.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
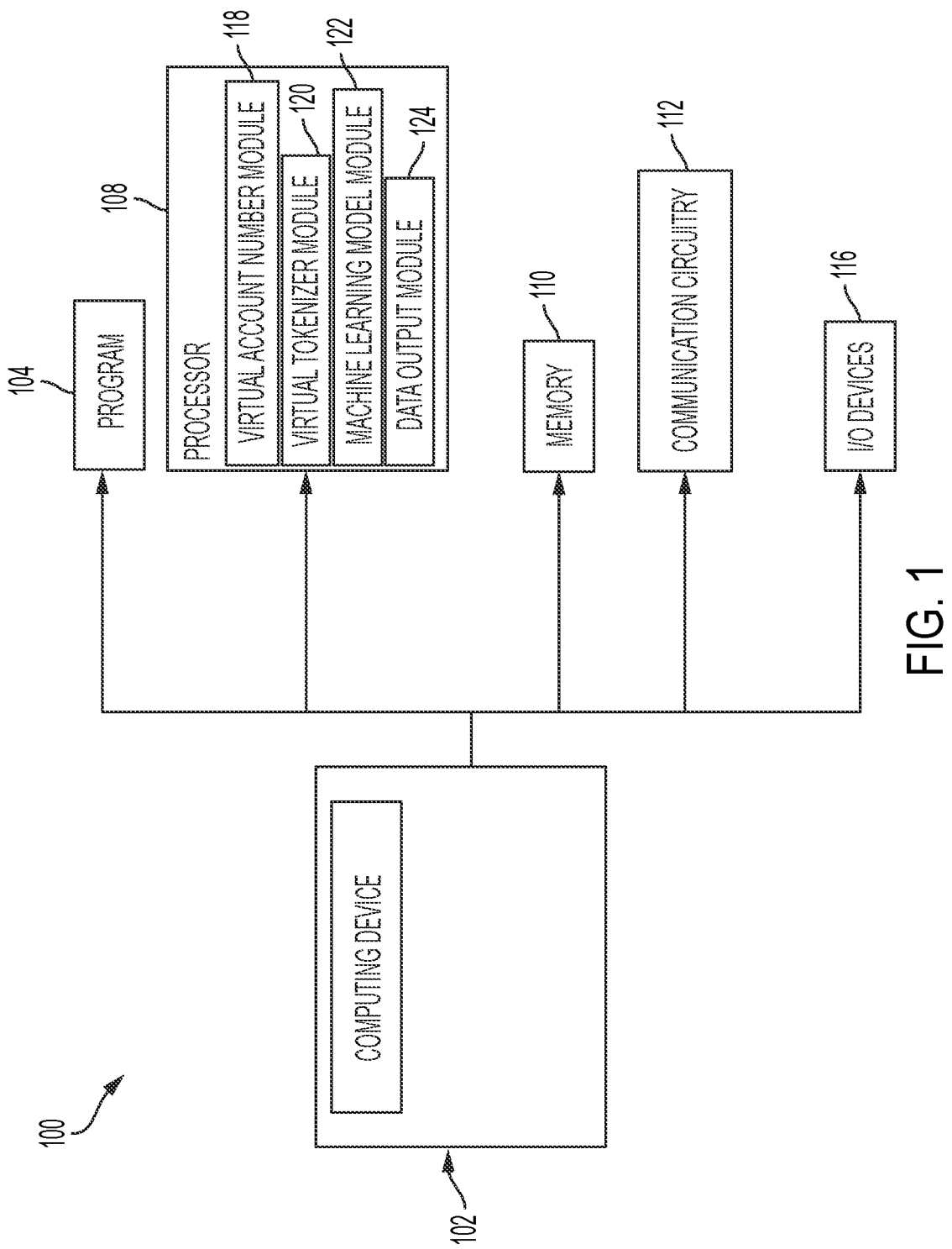
FIG. 1 is a block diagram show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and," In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of software application.

Embodiments of the present disclosure recognize a technological computer-centered problem associated with online activities that may expose an individual, or computing device associated with an individual, to bad actors. The technological computer-centered problem associated with the online activities arise primarily due to anonymity and lack of physical presence component. This technical computer-center problem is heightened when the bad actors target private financial information stored in the computing device associated with the individual. In some instances, the exposure of the computing device of the individual is most vulnerable during an online transaction, where the individual input personal and private information to acquire a service or product. Embodiments of the present disclosure detail a computer-centric technological solution that may dynamically map a virtual account number to an actual financial account associated with the individual without allowing a bad actor to interrupt a transfer of data by removing the need of manual input from the individual. In some embodiments, a practical solution may require generating a virtual token that is used to authorize a secure transfer of resources from the account associated with the individual to the merchant selling the good or services.

FIG. 1 depicts a block diagram of an exemplary computer-based system and platform for dynamically mapping a virtual account number to an actual financial account associated with a user, in accordance with at least one embodiment.

In some embodiments, a computing system 100 may include a computing device 102 associated with a user and a program 104. In some embodiments, the program 104 may be stored on the computing device 102. In some embodiments, the program 104 may be stored on a server computing device 106 (not shown). In some embodiments, the computing device 102 may include a processor 108, a memory 110, a communication circuitry 112 for communicating over a communication network 114 (not shown), and input and/or output (I/O) devices 116 such as a keyboard, mouse, a touchscreen, and/or a display, for example.

In some embodiments, the processor 108 may be configured to execute software modules such as a virtual account number generator module 118, a virtual tokenizer module 120, and a machine learning model module 122, and a data output module 124.

In some embodiments, an exemplary virtual primary account number generator module 118, of the present disclosure, utilizes at least one machine learning model described herein, to dynamically map a virtual account number to an actual financial account associated with a user. In some embodiments, the exemplary virtual primary account number generator module 118 receives input data as an electronic data modification instruction. Typically, electronic data modification may require a manual input from the user to dynamically authorize a transfer of data at a point of sale. In some embodiments, the electronic data modification instruction may comprise a virtual identifier associated with at least one attribute of a virtual record data structure and at least one modification condition. In some embodiments, the exemplary virtual primary account number generator module 118 may determine at least one record associated with the user based at least in part on the identified virtual record and the virtual identifier. In some embodiments, the exemplary virtual primary account number generator module 118 may determine at least one record modification preference associated with the at least one record associated with the user based at least in part on the at least one modification condition. In some embodiments, the exemplary virtual primary account number generator module 118 may predict at least one record-specific modification in response to the virtual record modification by utilizing at least one machine learning model within a plurality of machine learning models. In some embodiments, the at least one record-specific modification may be based at least in part on the at least one modification condition and the at least one modification preference. In some embodiments, the exemplary virtual primary account number generator module 118 may generate an authorization instruction to authorize the electronic data modification by modifying the at least one user record according to the at least one record specific modification via a dynamic transmission of instructions to at least one database management system stored within a computing device. In some embodiments, the exemplary virtual primary account number generator module 118 may instruct the computing device to display the at least one record-specific modification to the at least one record associated with the user.

Embodiments of the present disclosure herein describe systems for utilizing a machine learning based method for generating a virtual authorization that is associated with a user at a point of sale, where the generated virtual authorization is transmitted to a back-end system (i.e., server computing device) for analysis and storage. In some embodiments, the exemplary virtual primary account number generator module 118 may transmit instructions to the back-end system to identify a virtual primary account number ("PAN") associated with the user and to determine accounts and products that may be used for payment. In some embodiments, the back end system may determine account and products for payment by identifying the user associated with an identified virtual PAN; dynamically accessing a plurality preferences of the user for payment associated with an identified user using predefined rule models and a plurality of machine learning models, wherein recommendations may be generated based on the plurality of preferences such as reward point return, running balances, etc.; determining accounts and products to use to pay at the point of sale based on the accessed plurality of preferences of the user; generating a virtual token associated with the determined account or product that the user is attempting to purchase at the point of sale; and authorizing the purchase of the account or product using the generated virtual token at the point of sale by routing funds associated with the user to fulfill the payment.

In some embodiments, the virtual account number generator module 118 may identify metadata that is specific to each user in a plurality of users. For example, the virtual account number generator module 118 may identify metadata associated with the user as bank account numbers, bank routing numbers, available balance amount, etc. In some embodiments, the virtual tokenizer module 120 may generate a virtual token associated with the user that can authorize the transfer of funds from the accounts of that user to a third party for the purchase of a good or service. In some embodiments, the virtual tokenizer module 120 may generate at least one virtual token for a plurality of scenarios, where each generated virtual token is associated with a primary account number associated with the user. For example, the virtual tokenizer module 120 may generate at least one virtual token for a point of sale system and a mobile wallet system as a card is present in each system. In yet another example, the virtual tokenizer module 120 may generate at least one virtual token for a recurring charge as a card is previously on file. In some embodiments, the exemplary virtual primary account generator module may refer to a combination of the virtual account number generator module 118 and the virtual tokenizer module 120 as a staging phase or a pre-authorization phase. In some embodiments, the machine learning model module 122 may utilize one or more of algorithms to train one or more machine learning models. For example, the machine learning model module 122 may utilize a rule engine algorithm to train a machine learning model using default settings associated with a user based on one or more preferences of the user. In some embodiments, the machine learning model module 122 may utilize a plurality of recommendations associated with the user to train a machine learning model to identify category reward matching based on past purchase patterns, comparable profiles of other users, and/or effective allocation ratios. In some embodiments, the machine learning model module 122 may utilize the metadata associated with the user to train the machine learning model to determine a plurality of details associated with the transaction for subsequent use. In some embodiments, the machine learning model module 122 may utilize a point-of-sale system to train the machine learning model to quantify a probability of fraud associated with the transaction based on historical transaction data associated with the point-of-sale system.

In some embodiments, the data output module 124 may generate an authorization of a purchase of the good or service associated with the transaction based on the output of the machine learning model module 122, wherein the data output module 124 may utilize a decision engine algorithm 216 to dynamically update a profile associated with the user based on the output of the machine learning model module 122. In some embodiments, the data output module 124 may generate an authorization instruction to authorize an electronic data modification instruction to cause at least one modification within the machine learning model module 122 based on a modification of a record associated with the user. In some embodiments, the data output module 124 may transmit instructions to the computing device 102 to display the authorization associated with the transaction.

In some embodiments, the program 104 may receive an electronic data modification instruction of a virtual record modification to cause at least one data modification to at least one attribute of a virtual record data structure. In some embodiments, the program 104 may determine at least one user record associated with the virtual record based at least in part on the virtual identifier. In some embodiments, the program 104 may determine at least one record modification preference associated with the at least one user record based at least in part on the at least one modification condition. In some embodiments, the program 104 may utilize the record-specific modification machine learning model to predict at least one record specific modification in response to the virtual record modification based at least in part on the at least one modification condition and the at least one record modification preference. In some embodiments, the program 104 may generate an authorization instruction to authorize the electronic data modification instruction to cause the at least one modification by instructing at least one database manage system (e.g., back-end system) to modify the at least one user record according to the at least one record specific modification. In some embodiments, the program 104 may dynamically aggregate details associated with the account of the user based on the staging and/or the pre-authorization phase, and/or the output of the data output module 124, based on the utilization of the decision engine algorithm 216 within the machine learning model module 122. In some embodiments, the program 104 may dynamically map a f of data from a final system of record associated with the output of the machine learning model module 122 and the pre-authorization phase associated with the virtual tokenizer module 120. In some embodiments, the program 104 may dynamically remap the route of data from the final system of record to the pre-authorization phase based on an identified electronic data modification associated with the account of the user.

In some embodiments, the non-transient memory 110 may store the at least one generated virtual token associated with the user. In some embodiments, the memory 110 may store the output of the data output module 124. In some embodiments, the memory 110 may store the output of the machine learning model module 122.

Figure 2:
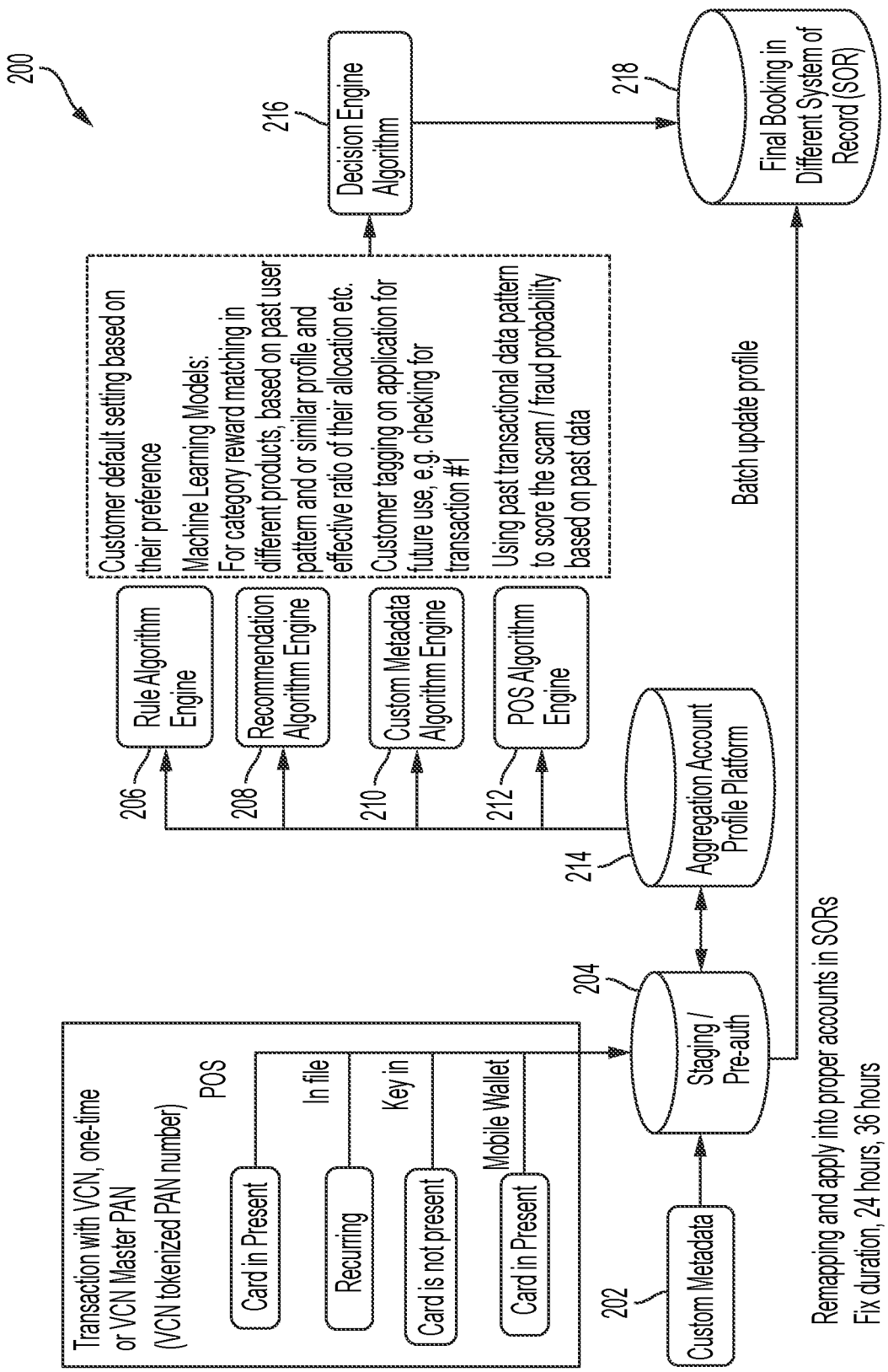
FIG. 2 is a block diagram depicting a dynamic authorization of a transfer of data based on a plurality of machine learning models using a decision engine algorithm, in accordance with one or more embodiments of the present disclosure.

FIG. 2 is a diagram 200 of a dynamic financial transaction processing system, in accordance with at least one embodiment of the present disclosure. In some embodiments, metadata 202 associated with a profile of a user may flow into a staging and/or pre-authorization database 204. In some embodiments, the virtual account number generator module 118 and the virtual tokenizer module 120 may generate at least one virtual token for a plurality of scenarios, wherein the output of these scenarios aggregates with the metadata 202 associated with the user within the staging and/or pre-authorization database 204. In some embodiments, the virtual account number generator module 118 may analyze the metadata 202 to identify a number of accounts associated with the user, identify respective balances for each account associated with the user, and select at least one identified balance of at least one account associated with the user within the staging and/or pre-authorization database 204. In some embodiments, the virtual tokenizer module 120 may generate a one-time virtual token for each scenario in the plurality of scenarios. In some embodiments, the virtual tokenizer module 120 may generate a master virtual token for the plurality of scenarios, where the master virtual token authorizes a modification in the account of the user based on the scenario.

In some embodiments, the machine learning model module 122 generates a machine learning model that utilizes training from a plurality of algorithms. In some embodiments, the machine learning model module 122 may utilize at least one rule algorithm engine 206 to train a machine learning model by identifying customer default settings associated with the preferences of the user. In some embodiments, the machine learning model module 122 may utilize a recommendation algorithm engine 208 to train the machine learning model by positively matching category rewards associated with the purchase of a plurality of products to a historical pattern of transactions associated with the user. In some embodiments, the recommendation algorithm engine 208 may be programmed to identify similar profiles of other users to the profile of the user based on a calculated comparison ratio. In some embodiments, the machine learning model module 122 may utilize a custom metadata algorithm engine 210 to train the particular machine learning model by dynamically tagging transaction(s) within the metadata 202 associated with the profile of the user for prediction of subsequent transactions. In some embodiments, the machine learning model module 122 may utilize a point-of-sale algorithm to train the machine learning model by dynamically calculating a risk score associated with a fraudulent transaction based on a positive match percentage using past transactional data associated with the profile of the user.

In some embodiments, the processor 108 may retrieve a plurality of machine learning algorithms from an aggregation account profile platform database 214, where the plurality of machine learning algorithms may include, but are not limited to, the rule algorithm engine 206, the recommendation algorithm engine 208, the custom metadata algorithm engine 210, and the point-of-sale (POS) algorithm engine 212. In some embodiments, the processor 108 dynamically selects at least one machine learning algorithm within the plurality of machine learning algorithms to train the machine learning model to authorize a transfer of data (e.g., purchase) between the generated virtual token associated with the transaction and the metadata 202 associated with the profile of the user. In some embodiments, the processor 108 may utilize a decision engine algorithm 216 to dynamically select the at least one machine learning algorithm within the plurality of machine learning algorithms stored within the aggregation account profile platform database 214. In some embodiments, the program 104, stored within the server computing device 106 (i.e., back-end system), may retrieve the at least one machine learning algorithm within the plurality of machine learning algorithms from the aggregation account profile platform database 214. In some embodiments, the program 104 dynamically selects the at least one machine learning model from the plurality of machine learning models using the decision engine algorithm 216.

In some embodiments, the processor 108 may generate a confirmation request that is transmitted to a graphic user interface for display in response to dynamically selecting at least one machine learning model within the plurality of machine learning models. In some embodiments, the processor 108 may authorize the transfer of data (e.g., transfer of funds and/or purchase) from the profile associated with the user within the pre-authorization phase to, for example, without limitation, a booking system of record 218. In some embodiments, the booking system of record 218 may be a merchant database. In some embodiments, the booking system of record 218 may be a point-of-sale computing device. In some embodiments, the booking system of record 218 may be a back end system that may be configured to identify a virtual primary account number associated with the user; access a plurality of preferences of payment associated with the user based on the virtual primary account number; determine which account/products associated with the user to use to purchase a good or a service; and dynamically optimize the purchase of the good or service by maximizing reward point return and minimizing running balances of the accounts/products associated with the user. In some embodiments, the processor 108 may dynamically map a route for the transfer of data from the pre-authorization phase to the booking system of record 218 for a predetermined duration of time based on the authorization, the at least one generated virtual token, and the at least one selected machine learning algorithm.

In some embodiments, the processor 108 may track the dynamic selections of machine learning algorithms used by the machine learning model module 122 for the predetermined duration of time to predict a behavior associated with the account of the user.

Figure 3:
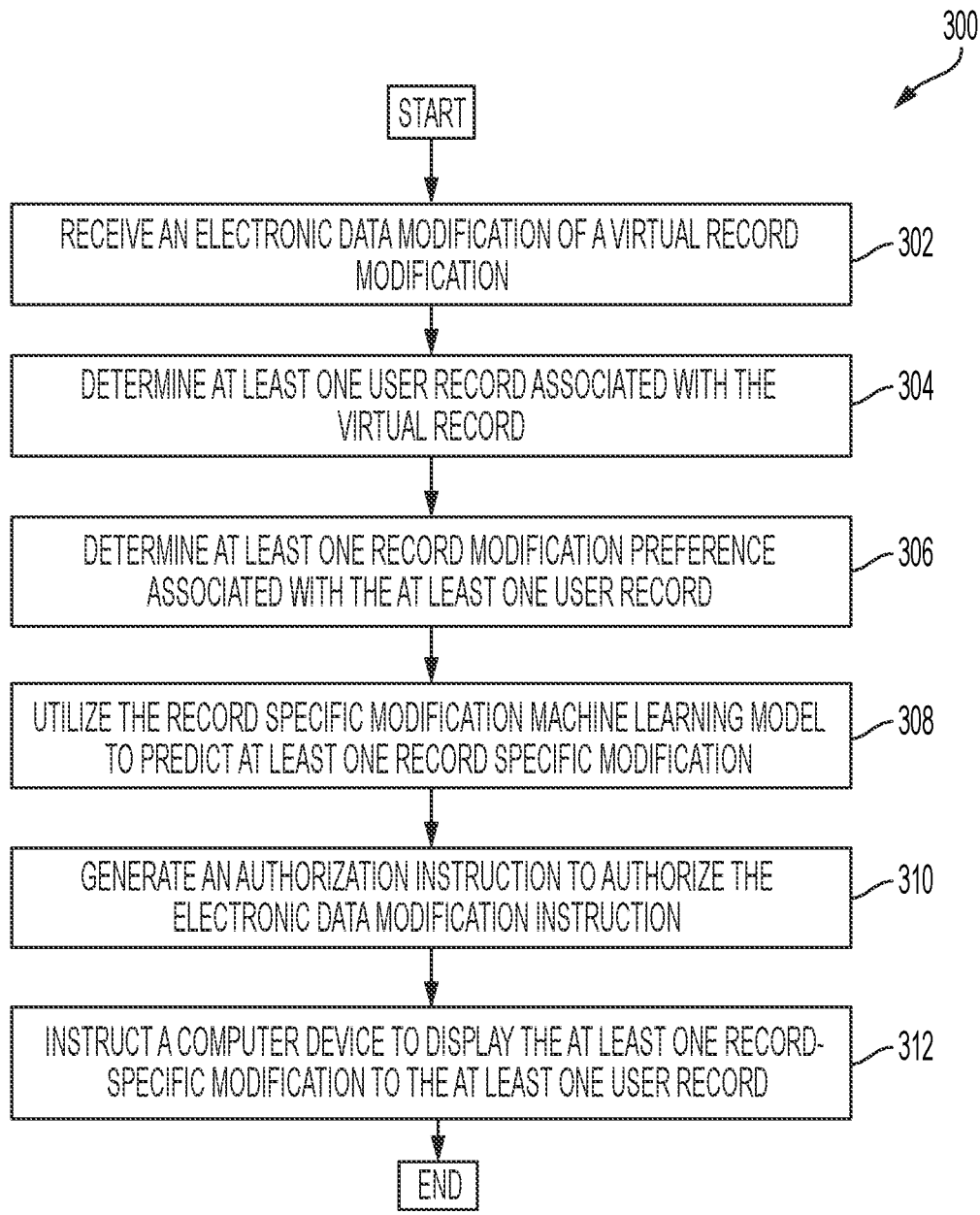
FIG. 3 is a flowchart illustrating operational steps for generating an authorization instruction, in accordance with one or more embodiments of the present disclosure.

FIG. 3 is a flowchart 300 illustrating operational steps for generating an authorization instruction to authorize an electronic data modification to the record of a user, in accordance with at least one embodiment of the present invention.

In step 302, the processor 108 within the computing device 102 may be programmed to receive an electronic data modification instruction of a virtual record modification to cause at least one data modification to at least one attribute of a virtual record data structure. In some embodiments, the electronic data modification instruction may include a virtual identifier associated with the virtual record and at least one modification condition associated with the virtual record data structure.

In step 304, the processor 108 may be programmed to determine at least one user record associated with the virtual record modification based at least in part on the virtual identifier. In some embodiments, the virtual primary account number generator module 118 may be programmed to identify the at least one user based on the virtual record and the virtual identifier using an artificial intelligence algorithm. In some embodiments, the virtual record may provide information associated with the banking account of the user, custom metadata associated with the user, and a plurality of payment preferences associated with the user.

In step 306, the processor 108 may be programmed to determine at least one record modification preference associated with the at least one user record based at least in part on the at least one modification condition. In some embodiments, the virtual tokenizer module 120 may be programmed to generate a virtual token based on the determined modification preference associated with the record of the user. In some embodiments, the generated virtual token may be a one-time use virtual token that is associated with a single transaction based on the modification preference associated with the record of the user. In some embodiments, the generated virtual token may be a master virtual token that can authorize a plurality of transaction based on the modification preference associated with the record of the user.

In step 308, the processor 108 may be programmed to utilize the record specific modification machine learning model to predict at least one record specific modification in response to the virtual record modification based at least in part on the at least one modification condition and the at least one record-specific modification. In some embodiments, the machine learning model module 122 may dynamically select at least machine learning algorithm from a plurality of machine learning algorithms by predicting the at least one machine learning algorithm that has a calculated positive match percentage with the modification preference associated with the record of the user.

In step 310, the processor 108 may be programmed to generate an authorization instruction to authorize the electronic data modification instruction to cause the at least one modification by instructing at least one database management system to modify the at least one user record according to the at least one record specific modification. In some embodiments, the machine learning model module 122 uses the decision engine algorithm 216 to dynamically select the at least one machine learning algorithm in the plurality of machine learning algorithms to authorize the transfer of data from the modification preference associated with the record of the user to the database management system (i.e., server computing device 106 or back-end system).

In step 312, the processer 108 may be programmed to instruct the computer device 102 to display the at least one record-specific modification to the at least one user record. In some embodiments, the data output module 124 may be programed to transmit one or more instructions to display the at least one generated virtual token and the authorization of the transfer of data to a graphic user interface stored within the computing device 102.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile™; (20) Microsoft DirectX™; (21).NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the exemplary ASR system of the present disclosure, utilizing at least one machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent transactions/users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, the exemplary ASR system of the present disclosure, utilizing at least one machine-learning model described herein, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

In some embodiments, the exemplary inventive computer-based systems/platforms, the exemplary inventive computer-based devices, and/or the exemplary inventive computer-based components of the present disclosure may be configured to securely store and/or transmit data (e.g., tokenized PAN numbers, etc.) by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Figure 4:
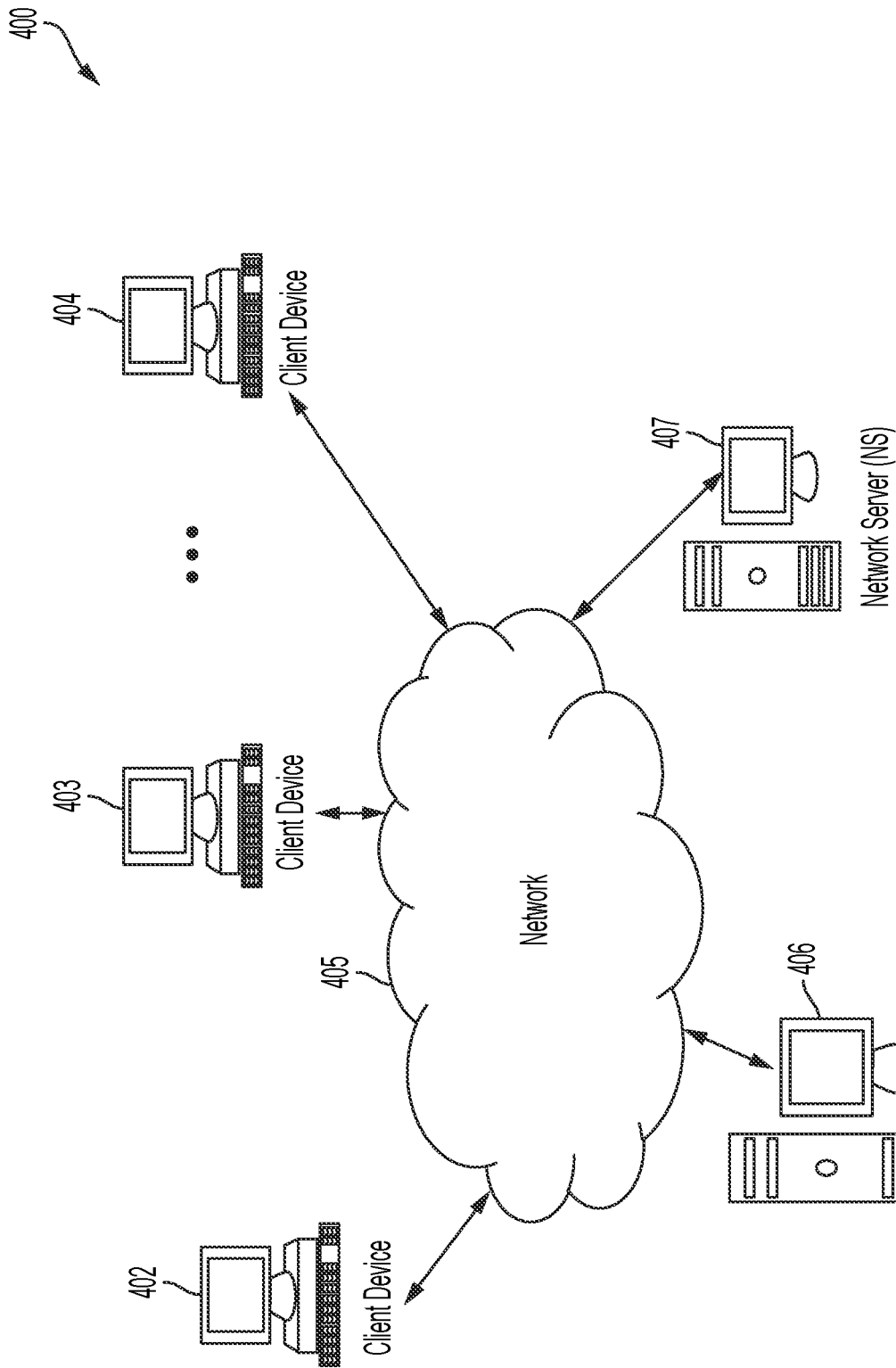
FIG. 4 depicts a block diagram of an exemplary computer-based system/platform in accordance with one or more embodiments of the present disclosure.

FIG. 4 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 400 may be configured to manage the exemplary ASR system of the present disclosure, utilizing at least one machine-learning model described herein.

In some embodiments, referring to FIG. 4, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi™, WiMax™, CDMA, satellite, ZigBee™, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java™, .Net™, QT™, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee™, 3G, 4G, 5G, GSM, GPRS, WiFi™, WiMax™, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server™, Novell NetWare™, or Linux™. In some embodiments, the exemplary server 406 or the exemplary server 407 may be used for and/or provide cloud and/or network computing. Although not shown in FIG. 6, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information (e.g., transactions, VCNs, etc.) using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 5:
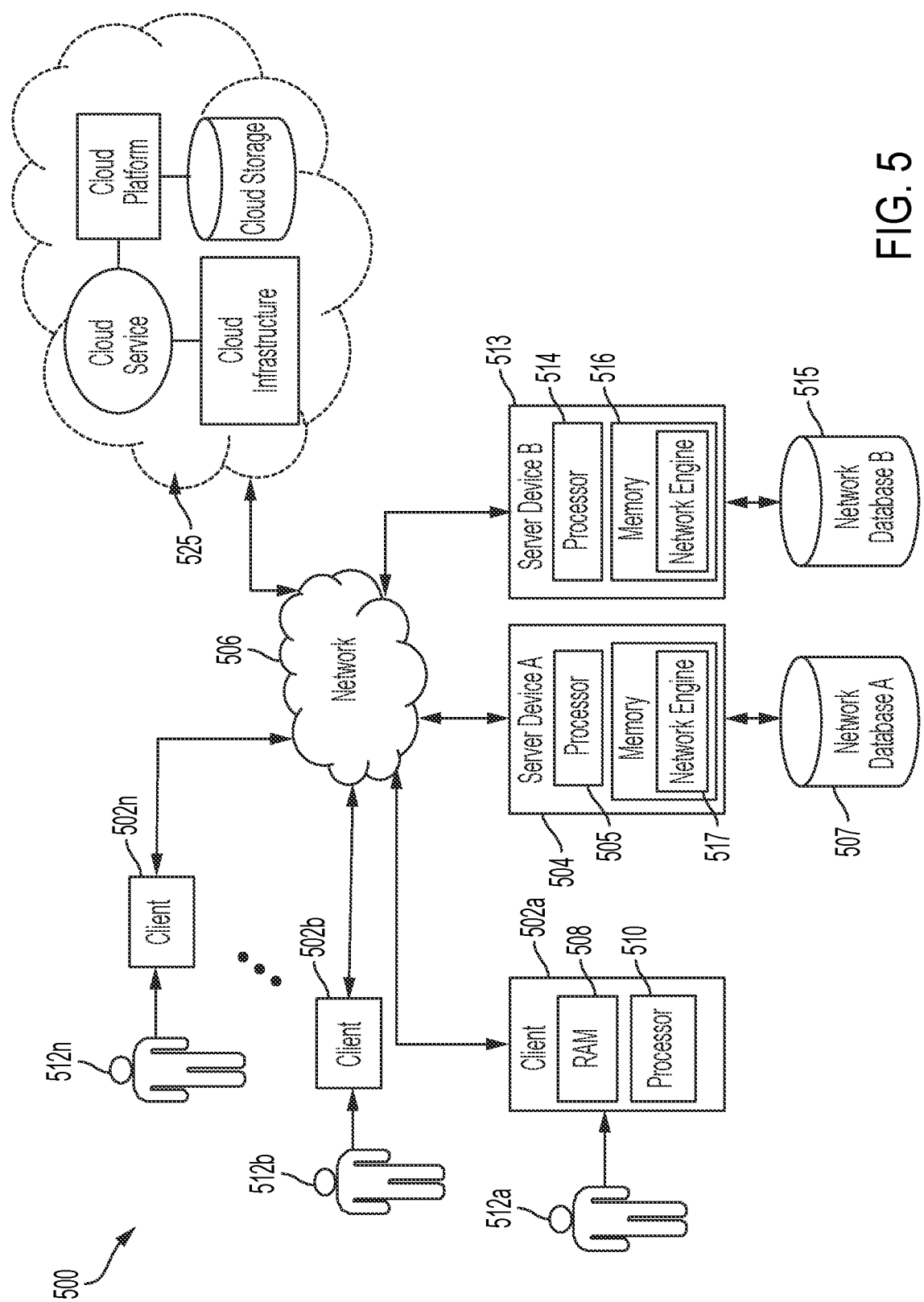
FIG. 5 depicts a block diagram of another exemplary computer-based system/platform in accordance with one or more embodiments of the present disclosure.

FIG. 5 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™, Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox™, and/or Opera™. In some embodiments, through the member computing client devices 502a through 502n, users, 512a through 512n, may communicate over the exemplary network 506 with each other and/or with other systems and/or devices coupled to the network 506. As shown in FIG. 5, exemplary server devices 504 and 513 may be also coupled to the network 506. Exemplary server device 504 may include a processor 505 coupled to a memory that stores a network engine 517. Exemplary server device 513 may include a processor 514 coupled to a memory 516 that stores a network engine. In some embodiments, one or more member computing devices 502a through 502n may be mobile clients. As shown in FIG. 5, the network 506 may be coupled to a cloud computing/architecture(s) 525. The cloud computing/architecture(s) 525 may include a cloud service coupled to a cloud infrastructure and a cloud platform, where the cloud platform may be coupled to a cloud storage.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2™, Adaptive Server Enterprise™, FileMaker™, Microsoft Access™, Microsoft SQL Server™, MySQL™, PostgreSQL™, and a NoSQL™ implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
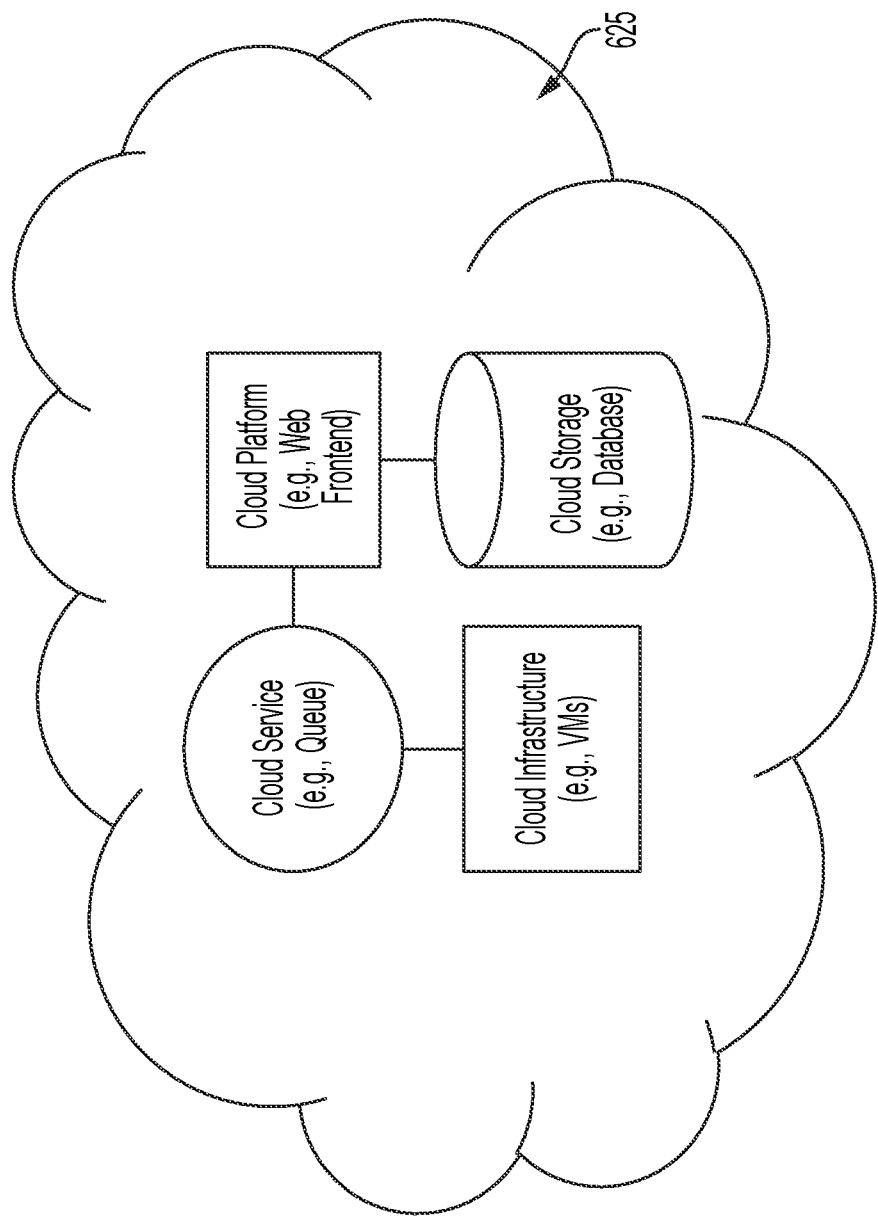
FIGS. 6 and 7 are diagrams illustrating implementations of cloud computing architecture/aspects with respect to which the disclosed technology may be specifically configured to operate, in accordance with one or more embodiments of the present disclosure.
Figure 7:
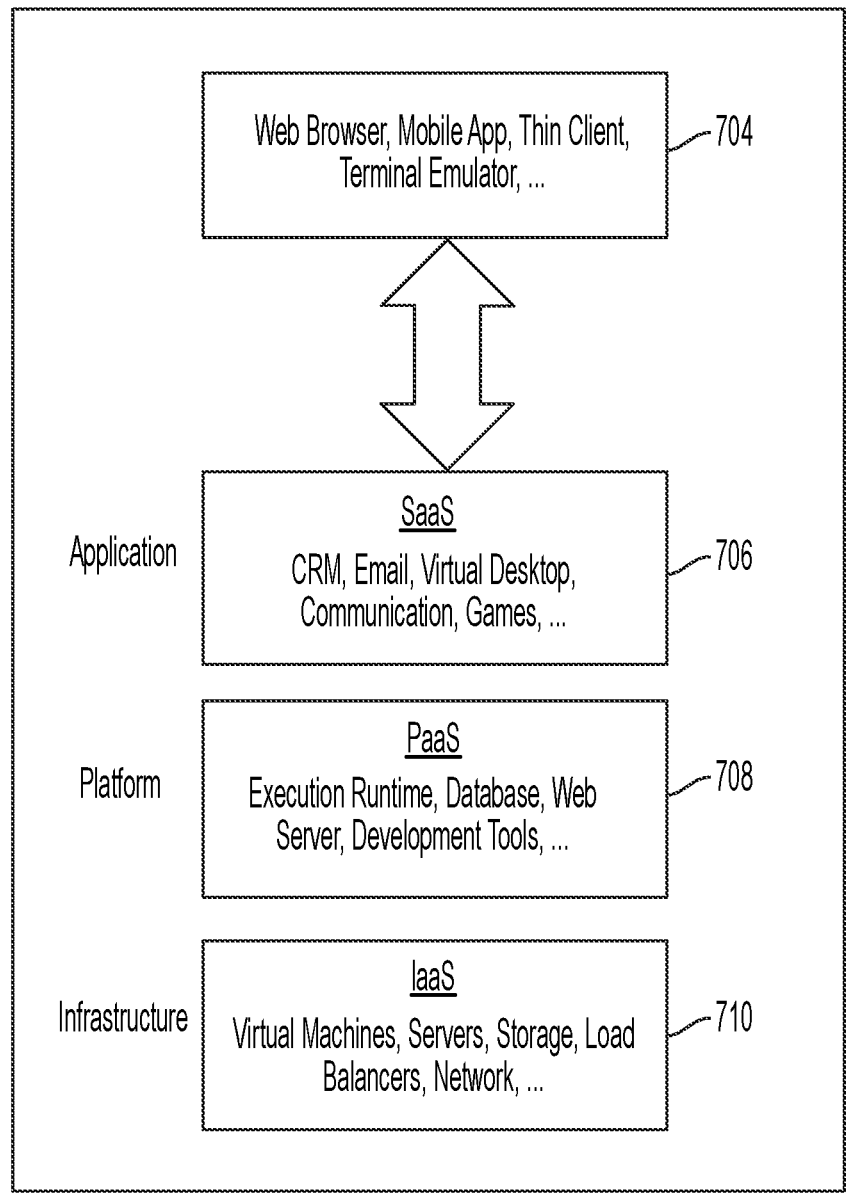

FIG. 6 and FIG. 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 6 illustrates an expanded view of the cloud computing/architecture(s) 525 found in FIG. 5 as cloud computing/architecture 625. FIG. 7, illustrates the exemplary inventive computer-based components of the present disclosure may be specifically configured to operate in the cloud computing/architecture 625 as a source database 704, where the source database 704 may be a web browser, a mobile application, a thin client, and a terminal emulator. In FIG. 7, the exemplary inventive computer-based systems/platforms, the exemplary inventive computer-based devices, and/or the exemplary inventive computer-based components of the present disclosure may be specifically configured to operate in a cloud computing/architecture such as, but not limiting to: infrastructure a service (IaaS) 710, platform as a service (PaaS) 708, and/or software as a service (SaaS) 706.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, an artificial recurrent neural network model, a long short-term memory ("LSTM") model, and a distributed long short-term memory ("DLS™") model, feed-forward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

At least some aspects of the present disclosure will now be described with reference to the following numbered clauses.

1. A method may include:
receiving, by at least one processor, an electronic data modification instruction of a virtual record modification to cause at least one data modification to at least one attribute of a virtual record data structure;
where the electronic data modification instruction of the virtual record modification includes:
a virtual identifier associated with the virtual record, and at least one modification condition;
determining, by the at least one processor, at least one user record associated with the virtual record based at least in part on the virtual identifier;
determining, by the at least one processor, at least one record modification preference associated with the at least one user record based at least in part on the at least one modification condition;
utilizing, by the at least one processor, a record-specific modification machine learning model to predict at least one record-specific modification in response to the virtual record modification based at least in part on the at least one modification condition and the at least one record modification preference;
generating, by the at least one processor, an authorization instruction to authorize the electronic data modification instruction to cause the at least one modification condition by instructing at least one database management system to modify the at least one user record according to the at least one record-specific modification; and
instructing, by the at least one processor, a computing device to display the at least one record-specific modification to the at least one user record.

2. The method according to clause 1, where instructing, by the at least one processor, the computing device to generate the virtual record identifier based at least in part on a user identifier associated with the virtual record; and where the computing device communicates the virtual record identifier to an initiator device that generates the electronic data modification instruction.

3. The method according to clause 1 or 2, further including generating, by the at least one processor, the virtual record identifier based at least in part on a user identifier associated with the virtual record; communicating, by the at least one processor, the virtual record identifier to the computing device; and where the computing device communicates the virtual record identifier to an initiator device that generates the electronic data modification instruction.

4. The method according to clause 1, 2, or 3, where the virtual record identifier includes a hash of a user identifier associated with the virtual record.

5. The method according to clause 1, 2, 3, or 4, where the virtual record identifier includes a randomly generated number associated with the virtual record.

6. The method according to clause 1, 2, 3, 4, or 5, further including: receiving, by the at least one processor, user preferences mapping the at least one modification condition to at least one record specific modification parameter; where the at least one record specific modification parameter includes at least one modification portion attributing the at least one modification to the at least one record specific modification; and determining, by the at least one processor, the at least one record specific modification based at least in part on the at least one modification and the at least one record specific modification parameter.

7. The method according to clause 1, 2, 3, 4, 5, or 6, further including utilizing, by the at least one processor, record specific modification machine learning model to predict the at least one record specific modification based at least in part on learned model parameters.

8. The method according to clause 1, 2, 3, 4, 5, 6, or 7, further including: determining, by the at least one processor, at least one record modification reward associated with the at least one user record; and utilizing, by the at least one processor, the record specific modification machine learning model to predict the at least one record specific modification to maximize the at least one record modification reward based at least in part on the at least one record modification reward, the at least one modification condition and the learning model parameters.

9. The method according to clause 1, 2, 3, 4, 5, 6, 7, or 8, where: the at least one electronic data modification instruction includes a transaction authorization request, the at least one record system includes a financial institution, and the at least one user record includes at least one financial record.

10. The method according to clause 1, 2, 3, 4, 5, 6, 7, 8, or 9, where the at least one user record is a plurality of user records.

11. A system including:
at least one processor configured to execute software instructions that cause the at least one processor to perform steps to:
receive an electronic data modification instruction of a virtual record modification to cause at least one data modification to at least one attribute of a virtual record data structure;
where the electronic data modification instruction of the virtual record modification includes:
a virtual identifier associated with the virtual record, and
at least one modification condition;
determine at least one user record associated with the virtual record based at least in part on the virtual identifier;
determine at least one record modification preference associated with the at least one user record based at least in part on the at least one modification condition;
utilize a record-specific modification machine learning model to predict at least one record-specific modification in response to the virtual record modification based at least in part on the at least one modification condition and the at least one record modification preference;
generate an authorization instruction to authorize the electronic data modification instruction to cause the at least one modification by instructing at least one database management system to modify the at least one user record according to the at least one record-specific modification; and
instruct a computing device to display the at least one record-specific modification to the at least one user record.

12. The system according to clause 11, where the at least one processor is further configured to execute software instructions that cause the at least one processor to perform further steps to:
instruct computing device to generate the virtual record identifier based at least in part on a user identifier associated with the virtual record; and
where the computing device communicates the virtual record identifier to an initiator device that generates the electronic data modification instruction.

13. The system according to clause 11 or 12, where the at least one processor is further configured to execute software instructions that cause the at least one processor to perform further steps to:
generate the virtual record identifier based at least in part on a user identifier associated with the virtual record;
communicate the virtual record identifier to the computing device; and
where the computing device communicates the virtual record identifier to an initiator device that generates the electronic data modification instruction.

14. The system according to clause 11, 12, or 13, where the virtual record identifier includes a hash of a user identifier associated with the virtual record.

15. The system according to clause 11, 12, 13, or 14, where the virtual record identifier includes a randomly generated number associated with the virtual record.

16. The system according to clause 11, 12, 13, 14, or 15, where the at least one processor is further configured to execute software instructions that cause the at least one processor to perform further steps to:
receive user preferences mapping the at least one modification condition to at least one record specific modification parameter;
where the at least one record specific modification parameter includes at least one modification portion attributing the at least one modification to the at least one record specific modification;
and determine the at least one record specific modification based at least in part on the at least one modification and the at least one record specific modification parameter.

17. The system according to clause 11, 12, 13, 14, 15, or 16, where the at least one processor is further configured to execute software instructions that cause the at least one processor to perform further steps to utilize the record specific modification machine learning model to predict the at least one record specific modification based at least in part on learned model parameters.

18. The system according to clause 11, 12, 13, 14, 15, 16, or 17, where the at least one processor is further configured to execute software instructions that cause the at least one processor to perform further steps to:
determine at least one record modification reward associated with the at least one user record; and
utilize the record specific modification machine learning model to predict the at least one record specific modification to maximize the at least one record modification reward based at least in part on the at least one record modification reward, the at least one modification condition and the learning model parameters.

19. The system according to clause 11, 12, 13, 14, 15, 16, 17, or 18, where:
the at least one electronic data modification instruction includes a transaction authorization request,
the at least one record system includes a financial institution, and
the at least one user record includes at least one financial record.

20. The system according to clause 11, 12, 13, 14, 15, 16, 17, 18, or 19, where the at least one user record is a plurality of user records.

What is claimed is:

1. A method comprising:
receiving, by at least one processor from an initiator device, an electronic data modification instruction to cause at least one data modification to at least one attribute of at least one account associated with a user profile, the electronic data modification instruction being associated with at least one activity;
wherein the electronic data modification instruction comprises:
a virtual identifier associated with the user profile, wherein the user profile is associated with a plurality of actual accounts, and
at least one modification condition;
wherein the virtual identifier is associated with metadata configured to cause the electronic modification instruction to be routed to a pre-authorization phase;
determining, by the at least one processor, in the pre-authorization phase, at least one account modification preference associated with the plurality of actual accounts based at least in part on the at least one modification condition;
utilizing, by the at least one processor, in the pre-authorization phase an account-specific modification machine learning model to predict at least one account-specific modification in response to the virtual account modification based at least in part on the at least one modification condition and the at least one account modification preference;
generating, by the at least one processor, in the pre-authorization phase, a virtual token mapped to a particular actual account of the plurality of actual accounts of the user profile based at least in part on the at least one account-specific modification indicating the particular actual res account;
routing, by the at least one processor, in the pre-authorization phase, using the virtual token, the electronic data modification instruction to at least one database management system to modify the particular actual account according to the at least one account-specific modification; and
instructing, by the at least one processor, in response at least one database management system modifying the particular actual account, the initiator device to perform the at least one activity associated with the electronic data modification instruction.

2. The method as recited in claim 1, further comprising:
instructing, by the at least one processor, the computing device to generate the virtual account identifier based at least in part on a user identifier associated with the virtual account; and
wherein the computing device communicates the virtual account identifier to an initiator device that generates the electronic data modification instruction.

3. The method as recited in claim 1, further comprising:
generating, by the at least one processor, the virtual account identifier based at least in part on a user identifier associated with the virtual account;
communicating, by the at least one processor, the virtual account identifier to the computing device; and
wherein the computing device communicates the virtual account identifier to an initiator device that generates the electronic data modification instruction.

4. The method as recited in claim 1, wherein the virtual account identifier comprises a hash of a user identifier associated with the virtual account.

5. The method as recited in claim 1, wherein the virtual account identifier comprises a randomly generated number associated with the virtual account.

6. The method as recited in claim 1, further comprising:
receiving, by the at least one processor, user preferences mapping the at least one modification condition to at least one account specific modification parameter;
wherein the at least one account specific modification parameter comprises at least one modification portion attributing the at least one modification to the at least one account specific modification; and
determining, by the at least one processor, the at least one account specific modification based at least in part on the at least one modification and the at least one account specific modification parameter.

7. The method as recited in claim 1, further comprising utilizing, by the at least one processor, account specific modification machine learning model to predict the at least one account specific modification based at least in part on learned model parameters.

8. The method as recited in claim 7, further comprising:
determining, by the at least one processor, at least one account modification reward associated with the at least one user account; and
utilizing, by the at least one processor, the account specific modification machine learning model to predict the at least one account specific modification to maximize the at least one account modification reward based at least in part on the at least one account modification reward, the at least one modification condition and the learning model parameters.

9. The method as recited in claim 1, wherein:
the at least one electronic data modification instruction comprises a transaction authorization request,
the at least one account system comprises a financial institution, and
the at least one user account comprises at least one financial account.

10. The method as recited in claim 1, wherein the at least one user account is a plurality of user accounts.

11. A system comprising:
at least one processor configured to execute software instructions that cause the at least one processor to perform steps to:
receive, from an initiator device, an electronic data modification instruction to cause at least one data modification to at least one attribute of at least one account associated with a profile, the electronic data modification instruction being associated with at least one activity;
wherein the electronic data modification instruction comprises:

a virtual-identifier associated with the user profile, wherein the user profile is associated ty actual accounts, and at least one modification condition;

wherein the virtual identifier is associated with metadata configured to cause the electronic data modification instruction to be routed to a pre-authorization phase;

determine in the pre-authorization phase, at least one account modification preference associated with the plurality of actual accounts based at least in part on the at least one modification condition;

utilize, in the pre-authorization phase, an account-specific modification machine learning model to predict at least one account-specific modification in response to the virtual account modification based at least in part on the at least one modification condition and the at least one account modification preference;

generate, in the pre-authorization phase, a virtual token mapped to a particular actual account of the plurality of actual accounts based at least in part on the at least one account-specific modification indicating the particular actual account;

route, the pre-authorization phase, using the virtual token, the electronic data modification instruction to at least one database management system to modify the particular actual account according to the at least one account-specific modification, and instruct, at least one database management system modifying the particular actual account the initiator device to perform the at least one activity associated with the electronic data modification instruction.

12. The system as recited in claim 11, wherein the at least one processor is further configured to execute software instructions that cause the at least one processor to perform further steps to:

instruct computing device to generate the virtual account identifier based at least in part on a user identifier associated with the virtual account; and wherein the computing device communicates the virtual account identifier to an initiator device that generates the electronic data modification instruction.

13. The system as recited in claim 11, wherein the at least one processor is further configured to execute software instructions that cause the at least one processor to perform further steps to:

generate the virtual account identifier based at least in part on a user identifier associated with the virtual account;

communicate the virtual account identifier to the computing device; and wherein the computing device communicates the virtual account identifier to an initiator device that generates the electronic data modification instruction.

14. The system as recited in claim 11, wherein the virtual account identifier comprises a hash of a user identifier associated with the virtual account.

15. The system as recited in claim 11, wherein the virtual account identifier comprises a randomly generated number associated with the virtual account.

16. The system as recited in claim 11, wherein the at least one processor is further configured to execute software instructions that cause the at least one processor to perform further steps to:

receive user preferences mapping the at least one modification condition to at least one account specific modification parameter;

wherein the at least one account specific modification parameter comprises at least one modification portion attributing the at least one modification to the at least one account specific modification; and determine the at least one account specific modification based at least in part on the at least one modification and the at least one account specific modification parameter.

17. The system as recited in claim 11, wherein the at least one processor is further configured to execute software instructions that cause the at least one processor to perform further steps to utilize a account specific modification machine learning model to predict the at least one account specific modification based at least in part on learned model parameters.

18. The system as recited in claim 17, wherein the at least one processor is further configured to execute software instructions that cause the at least one processor to perform further steps to:

determine at least one account modification reward associated with the at least one user account; and utilize the account specific modification machine learning model to predict the at least one account specific modification to maximize the at least one account modification reward based at least in part on the at least one account modification reward, the at least one modification condition and the learning model parameters.

19. The system as recited in claim 11, wherein:

the at least one electronic data modification instruction comprises a transaction authorization request, the at least one account system comprises a financial institution, and the at least one user account comprises at least one financial account.

20. The system as recited in claim 11, wherein the at least one user account is a plurality of user accounts.

\* \* \* \* \*